(12) United States Patent
Hudec

(10) Patent No.: US 10,336,398 B2
(45) Date of Patent: Jul. 2, 2019

(54) REAR SUSPENSION SYSTEM FOR A BICYCLE

(71) Applicant: CMH Plus Holdings Ltd., Nanaimo (CA)

(72) Inventor: Christopher Hudec, Nanaimo (CA)

(73) Assignee: CMH Plus Holdings Ltd., Nanaimo (CA)

( * ) Notice: Subject to any disclaimer, the term of this patent is extended or adjusted under 35 U.S.C. 154(b) by 0 days.

(21) Appl. No.: 15/553,321

(22) PCT Filed: Feb. 24, 2016

(86) PCT No.: PCT/CA2016/050188
§ 371 (c)(1),
(2) Date: Aug. 24, 2017

(87) PCT Pub. No.: WO2016/134471
PCT Pub. Date: Sep. 1, 2016

(65) Prior Publication Data
US 2018/0194428 A1 Jul. 12, 2018

Related U.S. Application Data

(63) Continuation-in-part of application No. 14/719,219, filed on May 21, 2015, now Pat. No. 9,216,791.
(Continued)

(51) Int. Cl.
*B62K 25/04* (2006.01)
*B62K 25/28* (2006.01)
(Continued)

(52) U.S. Cl.
CPC ............. *B62K 25/04* (2013.01); *B62J 1/02* (2013.01); *B62K 25/28* (2013.01); *B62K 25/286* (2013.01);
(Continued)

(58) Field of Classification Search
CPC ...... B62K 25/04; B62K 25/28; B62K 25/286; B62K 25/30; B62J 1/02
(Continued)

(56) References Cited

U.S. PATENT DOCUMENTS 1,047,430 A * 12/1912 Michaelson ........... B62K 25/30
267/171
1,272,399 A * 7/1918 Douglas ............... B62K 25/286
280/284
(Continued)

FOREIGN PATENT DOCUMENTS

DE 4435482 A1 4/1996
FR 2774933 A1 8/1999
(Continued)

OTHER PUBLICATIONS

International Search Report and Written Opinion for PCT/CA2016/050188, dated Jun. 6, 2016.

*Primary Examiner* — Joseph M Rocca
*Assistant Examiner* — Conan D Duda
(74) *Attorney, Agent, or Firm* — Klarquist Sparkman, LLP

(57) ABSTRACT

Rear suspension system for a bicycle in which there are two links pivotally interconnecting the front triangle (being, the bicycle component having the seat and bottom bracket) and the rear triangle (being, the component to which the rear wheel is mounted), and the link pivots on the front triangle are located no higher than the location of the instant centre of the rear triangle at the sag point. Suspension stability may be enhanced by having one of the links oriented horizontally at the sag point and/or by having the link pivots on the front triangle in horizontal alignment.

10 Claims, 8 Drawing Sheets

Related U.S. Application Data

(60) Provisional application No. 62/173,211, filed on Jun. 9, 2015, provisional application No. 62/121,900, filed on Feb. 27, 2015.

(51) Int. Cl.
  *B62K 25/30* (2006.01)
  *B62J 1/02* (2006.01)

(52) U.S. Cl.
  CPC ........ *B62K 25/30* (2013.01); *B62K 2025/045* (2013.01)

(58) Field of Classification Search
  USPC ........................................................ 280/283
  See application file for complete search history.

(56) References Cited

U.S. PATENT DOCUMENTS

| | | | | |
|---|---|---|---|---|
| 1,283,030 | A * | 10/1918 | Ashton | B62K 25/286 280/284 |
| 4,671,525 | A | 6/1987 | Ribi | |
| 4,789,174 | A | 12/1988 | Lawwill | |
| 5,335,929 | A * | 8/1994 | Takagaki | B62K 25/286 280/283 |
| 5,409,249 | A | 4/1995 | Busby | |
| 5,452,910 | A | 9/1995 | Harris | |
| 5,553,881 | A | 9/1996 | Klassen et al. | |
| 5,628,524 | A | 5/1997 | Klassen et al. | |
| 6,036,213 | A * | 3/2000 | Busby | B62K 25/286 280/284 |
| 6,206,397 | B1 | 3/2001 | Klassen et al. | |
| 6,286,642 | B1 * | 9/2001 | Yi | B62K 25/04 188/269 |
| 6,361,059 | B1 * | 3/2002 | Ellsworth | B62K 25/30 280/284 |
| 6,843,494 | B2 | 1/2005 | Lam | |
| 6,877,591 | B1 * | 4/2005 | Hso | B62K 25/286 188/321.11 |
| 6,969,081 | B2 | 11/2005 | Whyte | |
| 7,048,292 | B2 | 5/2006 | Weagle | |
| 7,066,481 | B1 * | 6/2006 | Soucek | B62K 25/286 280/284 |
| RE39,159 | E * | 7/2006 | Klassen | B62K 25/286 280/283 |
| 7,100,930 | B2 | 9/2006 | Saiki | |
| 7,128,329 | B2 | 10/2006 | Weagle | |
| 7,240,912 | B2 | 7/2007 | Whyte | |
| 7,556,276 | B1 | 7/2009 | Dunlap | |
| 7,828,314 | B2 | 11/2010 | Weagle | |
| 7,934,739 | B2 | 5/2011 | Domahidy | |
| 8,136,829 | B1 * | 3/2012 | Kang | B62K 25/30 280/275 |
| 9,145,185 | B1 * | 9/2015 | Claro | B62K 25/286 |
| 2001/0030408 | A1 * | 10/2001 | Miyoshi | B62K 25/04 280/276 |
| 2003/0011167 | A1 * | 1/2003 | Turner | B62K 25/286 280/284 |
| 2003/0020255 | A1 * | 1/2003 | Felsl | B62K 25/04 280/283 |
| 2003/0038450 | A1 * | 2/2003 | Lam | B62K 25/286 280/284 |
| 2003/0132603 | A1 * | 7/2003 | Girard | B62K 25/286 280/283 |
| 2003/0160421 | A1 * | 8/2003 | Assier | B62K 25/286 280/283 |
| 2004/0046355 | A1 * | 3/2004 | Carroll | B62K 25/28 280/284 |
| 2004/0070169 | A1 | 4/2004 | Lesage et al. | |
| 2004/0239071 | A1 * | 12/2004 | Chamberlain | B62K 25/286 280/284 |
| 2004/0256834 | A1 | 12/2004 | Whyte | |
| 2005/0046142 | A1 * | 3/2005 | Chamberlain | B62K 19/34 280/284 |
| 2005/0057018 | A1 | 3/2005 | Saiki | |
| 2005/0156400 | A1 * | 7/2005 | Chang | B62K 25/286 280/275 |
| 2005/0156402 | A1 * | 7/2005 | Carroll | B62K 25/28 280/284 |
| 2005/0184483 | A1 * | 8/2005 | Buckley | B62K 25/286 280/284 |
| 2005/0285367 | A1 * | 12/2005 | Chang | B62K 25/286 280/284 |
| 2006/0022421 | A1 | 2/2006 | Dreher, Jr. | |
| 2006/0061059 | A1 * | 3/2006 | Lesage | B62K 25/286 280/284 |
| 2006/0065496 | A1 * | 3/2006 | Fox | B62K 25/04 188/275 |
| 2006/0071442 | A1 * | 4/2006 | Hoogendoorn | B62K 25/286 280/275 |
| 2006/0071444 | A1 * | 4/2006 | Griffiths | B62K 25/16 280/283 |
| 2006/0181053 | A1 * | 8/2006 | Huang | B62K 25/286 280/284 |
| 2006/0197306 | A1 * | 9/2006 | O'Connor | B62K 25/286 280/284 |
| 2006/0225942 | A1 | 10/2006 | Weagle | |
| 2006/0284394 | A1 * | 12/2006 | Chamberlain | B62K 19/00 280/283 |
| 2007/0108725 | A1 * | 5/2007 | Graney | B62K 25/286 280/284 |
| 2007/0194550 | A1 * | 8/2007 | Wadelton | B62K 25/26 280/124.116 |
| 2007/0246909 | A1 * | 10/2007 | Weng | B62K 25/286 280/284 |
| 2008/0054595 | A1 | 3/2008 | Lu | |
| 2008/0067772 | A1 * | 3/2008 | Weagle | B62K 25/286 280/124.134 |
| 2008/0217882 | A1 * | 9/2008 | Beaulieu | B62K 25/28 280/261 |
| 2008/0252040 | A1 * | 10/2008 | Colegrove | B62K 25/286 280/284 |
| 2008/0277900 | A1 | 11/2008 | I | |
| 2009/0000886 | A1 * | 1/2009 | McAndrews | B62K 25/286 188/275 |
| 2009/0001686 | A1 * | 1/2009 | Currie | B62K 25/286 280/285 |
| 2009/0026728 | A1 * | 1/2009 | Domahidy | B62K 25/286 280/284 |
| 2009/0072512 | A1 * | 3/2009 | Earle | B62K 25/286 280/283 |
| 2009/0102158 | A1 * | 4/2009 | Antonot | B62K 25/286 280/284 |
| 2009/0261556 | A1 * | 10/2009 | Beale | B62K 19/18 280/284 |
| 2009/0315296 | A1 * | 12/2009 | Berthold | B62K 25/286 280/284 |
| 2009/0322055 | A1 * | 12/2009 | Arraiz | B62K 25/286 280/284 |
| 2010/0059965 | A1 * | 3/2010 | Earle | B62K 25/26 280/284 |
| 2010/0096831 | A1 * | 4/2010 | Tanouye | B62K 3/04 280/281.1 |
| 2010/0102531 | A1 * | 4/2010 | Graney | B62K 25/286 280/284 |
| 2010/0109282 | A1 * | 5/2010 | Weagle | B62K 25/28 280/284 |
| 2010/0127473 | A1 * | 5/2010 | Cocalis | B62K 25/28 280/283 |
| 2010/0156066 | A1 * | 6/2010 | O'Connor | B62K 3/04 280/283 |
| 2010/0264623 | A1 * | 10/2010 | Peterson | B62K 25/286 280/283 |
| 2010/0327542 | A1 * | 12/2010 | Hara | B62J 99/00 280/5.503 |
| 2010/0327553 | A1 * | 12/2010 | Talavasek | B62K 25/286 280/284 |
| 2010/0327554 | A1 * | 12/2010 | Talavasek | B62K 25/286 280/284 |

(56) References Cited

U.S. PATENT DOCUMENTS

| | | | |
|---|---|---|---|
| 2010/0327556 A1* | 12/2010 | Chamberlain | B62K 3/04 280/284 |
| 2011/0018228 A1* | 1/2011 | Beale | B62K 25/286 280/284 |
| 2011/0175318 A1* | 7/2011 | Rae | B62K 25/04 280/124.164 |
| 2011/0187078 A1* | 8/2011 | Higgon | B62K 25/04 280/284 |
| 2011/0202236 A1* | 8/2011 | Galasso | B62K 25/04 701/37 |
| 2011/0227312 A1* | 9/2011 | Earle | B62K 25/20 280/283 |
| 2011/0233892 A1* | 9/2011 | Domahidy | B62K 25/286 280/284 |
| 2011/0272909 A1* | 11/2011 | Twers | B62K 25/26 280/124.125 |
| 2012/0007327 A1* | 1/2012 | Talavasek | B62K 25/20 280/124.1 |
| 2012/0074666 A1* | 3/2012 | Chamberlain | B62K 25/286 280/284 |
| 2012/0126506 A1 | 5/2012 | Zawistowski | |
| 2012/0228850 A1* | 9/2012 | Tseng | B62K 25/28 280/283 |
| 2012/0299268 A1* | 11/2012 | Chamberlain | B62K 25/286 280/284 |
| 2013/0093160 A1* | 4/2013 | Alsop | B62K 25/286 280/284 |
| 2013/0147152 A1* | 6/2013 | Paquin | B62K 19/34 280/281.1 |
| 2013/0161920 A1 | 6/2013 | Park et al. | |
| 2013/0214508 A1* | 8/2013 | Beale | B62K 25/286 280/285 |
| 2013/0241174 A1* | 9/2013 | Meyer | B62K 25/30 280/281.1 |
| 2013/0249188 A1* | 9/2013 | Beale | B62K 19/00 280/284 |
| 2013/0285346 A1 | 10/2013 | Wimmer | |
| 2014/0001729 A1* | 1/2014 | Hudec | B62K 25/28 280/283 |
| 2014/0042726 A1 | 2/2014 | Canfield et al. | |
| 2014/0060950 A1* | 3/2014 | Beutner | B62K 25/286 180/206.4 |
| 2014/0159338 A1* | 6/2014 | Thoma | B62K 25/286 280/284 |
| 2014/0197617 A1* | 7/2014 | Hoogendoorn | B62K 25/286 280/283 |
| 2014/0210180 A1* | 7/2014 | Hudak | B62K 25/04 280/274 |
| 2014/0265208 A1* | 9/2014 | Voss | B62K 25/04 280/210 |
| 2015/0001829 A1* | 1/2015 | Berthold | B62K 3/02 280/284 |
| 2015/0021876 A1* | 1/2015 | Hartmann | B62K 15/008 280/259 |
| 2015/0035241 A1* | 2/2015 | McLeay | B60G 11/12 280/5.513 |
| 2015/0054250 A1* | 2/2015 | Hu | B62K 25/28 280/276 |
| 2015/0069735 A1* | 3/2015 | Hoogendoorn | B62K 25/28 280/284 |
| 2015/0115569 A1* | 4/2015 | Matheson | B62K 25/286 280/284 |
| 2015/0130153 A1* | 5/2015 | Chen | B62K 25/04 280/124.108 |
| 2015/0137477 A1* | 5/2015 | Chamberlain | B62K 3/02 280/283 |
| 2015/0175238 A1* | 6/2015 | Lumpkin | B62K 19/00 280/284 |
| 2015/0197308 A1* | 7/2015 | Butora | B62K 25/10 280/283 |
| 2015/0251724 A1* | 9/2015 | Hudec | B62K 25/04 280/283 |
| 2015/0360743 A1* | 12/2015 | O'Connor | B62K 25/286 280/284 |
| 2016/0167741 A1* | 6/2016 | Emura | B62M 9/135 280/281.1 |
| 2016/0257371 A1* | 9/2016 | Droux | B62K 25/286 |
| 2016/0257373 A1* | 9/2016 | Emura | B62M 6/50 |
| 2016/0297496 A1* | 10/2016 | Chen | B62K 25/00 |
| 2016/0311493 A1* | 10/2016 | Scheffer | B62K 25/286 |
| 2016/0375954 A1* | 12/2016 | Talavasek | B62K 19/36 180/220 |
| 2017/0101152 A1* | 4/2017 | Pedretti | B62K 13/08 |
| 2017/0151996 A1* | 6/2017 | Southall | B62K 25/04 |
| 2017/0151998 A1* | 6/2017 | Negoro | B62J 6/001 |
| 2017/0174095 A1* | 6/2017 | Shieh | B62K 19/40 |
| 2017/0240243 A1* | 8/2017 | Goes | B62K 25/286 |
| 2017/0274962 A1* | 9/2017 | Emura | B62K 25/286 |
| 2017/0313381 A1* | 11/2017 | Mano | B62K 25/286 |
| 2017/0313385 A1* | 11/2017 | Emura | B62M 9/04 |
| 2017/0314593 A1* | 11/2017 | Mano | B62K 25/286 |
| 2018/0017152 A1* | 1/2018 | Emura | F16H 57/025 |
| 2018/0037294 A1* | 2/2018 | Kurotobi | B62J 1/10 |
| 2018/0037295 A1* | 2/2018 | Beale | B62K 25/26 |
| 2018/0099723 A1* | 4/2018 | Rojo Vidal | B62K 25/28 |
| 2018/0148123 A1* | 5/2018 | Neilson | B62K 25/286 |
| 2018/0265164 A1* | 9/2018 | Li | B62K 25/28 |
| 2018/0265165 A1* | 9/2018 | Zawistowski | B62K 25/286 |

FOREIGN PATENT DOCUMENTS

| | | |
|---|---|---|
| FR | 2776981 A3 | 10/1999 |
| JP | H01127475 A | 5/1989 |
| JP | 2000302080 A | 10/2000 |
| WO | 2012122634 A1 | 9/2012 |

* cited by examiner

REAR SUSPENSION SYSTEM FOR A BICYCLE

This is the U.S. National Stage of International Application No. PCT/CA2016/050188, filed Feb. 24, 2016, which was published in English under PCT Article 21(2), which in turn claims the benefit of U.S. Application No. 62/121,900, filed 27 Feb. 2015; priority to U.S. application Ser. No. 14/719,219, filed 21 May 2015 (now, U.S. Pat. No. 9,216,791, granted 22 Dec. 2015); and the benefit of U.S. Application No. 62/173,211, filed 9 Jun. 2015, all of which are incorporated herein in their entirety.

FIELD OF THE INVENTION

The present invention relates to bicycle suspension systems, namely rear suspension systems.

BACKGROUND OF THE INVENTION

A bicycle frame is the main component of a bicycle, on to which wheels and other components are fitted. The great majority of today's rigid-frame bicycles have a frame with upright seating. Such upright rigid-frame bicycles generally feature the diamond frame, a truss consisting of two triangles: the front triangle and the rear triangle. In a conventional diamond frame, the "front triangle" is not a true triangle because it consists of four tubes: the head tube, top tube, down tube and seat tube. The head tube contains the headset, the set of bearings that allows the front fork (which supports the front wheel) to turn smoothly for steering and balance. The top tube connects the head tube to the seat tube at the top, and the down tube connects the head tube to the bottom bracket. The rear triangle consists of the seat tube and paired chain stays and paired seat stays. The chain stays run essentially parallel to the chain, connecting the bottom bracket to the rear fork ends (which support the rear wheel). The seat stays connect the top of the seat tube (at or near the same point as the top tube) to the rear fork ends.

Many modern bicycles do not utilize a diamond frame, for example because: the frame is constructed in such a way that it does not consist of tubes attached one to another (for example, frames made of composite materials); or the frame involves a rear suspension system permitting rearward components of the bicycle (e.g., the rear wheel) to move relative to other components of the bicycle (e.g., the seat); or both. However, the terms used to describe the members of a conventional diamond frame (being, head tube, top tube, down tube, seat tube, chain stays and seat stays) are often used to describe analogous features on non-diamond frames and are at times so used herein.

Most bicycles use a chain to transmit power to the rear wheel. The drivetrain begins with pedals which rotate the cranks, which are attached to a spindle that rotates within the bottom bracket. With a chaindrive, a chainring attached to a crank drives the chain, which in turn rotates the rear wheel via a rear sprocket. Most chaindrive systems have some form of gearing, typically comprising multiple rear sprockets of different sizes, multiple chainrings of different sizes and user controllable devices (referred to as derailleurs) for moving the chain between rear sprockets and between the chainrings, so as to selectively vary the gear ratio. In chain drive systems, the portion of chain extending between the top of a chainring and the top of a rear sprocket conveys the motive force from the pedals to the rear wheels. When the rider is pedalling, this top portion of chain is under tension. In a bicycle without a rear suspension, this chain tension is resisted by the the rear triangle, to which the rear wheel is mounted. However, in a bicycle with a rear suspension system, some portion of the force of such chain tension may be imparted to the suspension system. As well, movement of the rear suspension system relative to the bottom bracket may dynamically tension or slacken the portion of chain extending between the top of a chainring and the top of a rear sprocket, thereby affecting the pedalling resistance experienced by the rider. The direction of the force conveyed along the portion of chain extending between the top of a chainring and the top of a rear sprocket is referred to as the chain line. A further complication is that bicycles typically have multiple chainrings and multiple rear sprockets so as to provide rider selectable gear ratios; in the result, most bicycles would not have a single chain line, but rather would have multiple chain lines.

A bicycle suspension is the system or systems used to suspend the rider and all or part of the bicycle in order to protect them from the roughness of the terrain over which they travel. Bicycle suspensions are used primarily on mountain bikes, but are also common on hybrid bicycles, and can even be found on some road bicycles. Bicycle suspension can be implemented in a variety of ways, including: front-fork suspension and rear suspension. It is not uncommon for a mountain bike to have front suspension but no rear suspension (such a suspension configuration is often referred to as a hardtail). However, it is uncommon for a mountain bike to have a rear suspension system but no front suspension system. Thus, rear suspension systems on mountain bikes are typically part of a full suspension system.

Suspension systems for mountain bikes first appeared in roughly the early 1990's. Over the ensuing years developers and users of mountain bike suspension systems recognized a variety of factors affecting suspension performance and general riding performance of suspension system, which factors are interrelated in dynamic and complex ways. It was soon realized that the fact that bicycles are powered by human effort means that effects on the drive train caused by suspension system movement that would, in the case of engine driven vehicles, be minor or unnoticeable, are significant in bicycles. In particular, rear suspension systems involve complicated interactions of multiple connected components and multiple performance considerations.

In the field of bicycle suspension systems, the following terms are generally used as follows:
 Travel generally refers to how much movement a suspension allows, and is usually quantified based on the available range of movement of the wheel axle.
 Brake jack refers extension of the rear suspension caused by braking (a feature of some early suspension designs).
 Brake squat refers to compression of the rear suspension caused by braking (which in moderation, can be beneficial to counteract the normal forward weight transfer caused by braking).
 Bob, pedal bob, or monkey motion refer to undesirable repeated compression and rebound with each pedal stroke.
 Squat refers to generally undesirable compression of the rear suspension under acceleration (and the associated rearward weight shift).
 Pedal feedback (or chainstay lengthening) refers to torque applied to the crankset by the chain caused by motion of the rear axle relative to the bottom bracket. Pedal feedback is caused by an increase in the distance between the chainring and rear sprocket, and it can be felt by the rider as a torque on the crankset in the rotational direction opposite to forward pedalling.

Anti-squat refers to chainstay lengthening related to pedalling-induced suspension extension, which provides resistance to the weight shift of the rider due to acceleration and resulting compression of the rear suspension. Too much anti-squat or chainstay lengthening results in resistance to compression of the suspension due to pedal forces when the rear wheel hits an obstacle.

Preload refers to the force applied to spring component before external loads, such as rider weight, are applied. The amount of preload necessary depends on the rider weight and the parameters of the spring components. More preload makes the suspension sag less and less preload makes the suspension sag more. Adjusting preload affects the ride height of the suspension.

Rebound refers to the rate at which a suspension component returns to its original configuration after absorbing a shock. The term also generally refers to rebound damping or rebound damping adjustments on shocks, which vary the rebound speed. Increasing rebound damping causes the shock to return at a slower rate.

Sag refers to how much a suspension moves under just the static load of the rider. Sag allows the rear wheel to drop into depressions in the terrain, maintaining traction.

Sag point refers to a design/tuning parameter, being a desired suspension sag for a rider, which is generally between 20-35% of the total suspension travel depending on the rider's preference and the suspension design.

Compression damping refers to systems that slow the rate of compression in a front fork shock or rear shock. Compression damping is usually accomplished by forcing a hydraulic fluid (such as oil) through a valve when the shock becomes loaded and is often adjustable.

Unsprung mass is the mass of the portions of bicycles that is not supported by the suspension systems.

One of the simplest and most common bicycle suspension designs is the single-pivot system, in which the rear wheel of the bicycle is attached to the front triangle of the bicycle by a single swingarm (often a generally triangular component and often referred to as the rear triangle) pivoting about a pivot located on the front triangle. With the single-pivot design, the rear wheel absorbs bumps from irregular terrain by moving in a simple curve (i.e., a circular arc) about the pivot.

More complicated suspension designs use a configuration of linkages that is more complicated than a mere single pivot and that generally provide for an axle path of travel during suspension compression and extension that is other than the simple curve about the pivot point achievable with the single-pivot suspensions. A popular linkage suspension design is shown in FIG. 3 in U.S. Pat. No. 5,899,480 (commonly referred to as a Horst Link suspension system after the inventor, Horst Leitner). Dual short-link designs are a popular type of four-bar linkage suspension systems comprising two short links interposed between the front triangle and the rear triangle (i.e. the component to which the rear wheel is mounted). A dual short link design called the Virtual Pivot Point suspension (or VPP), is disclosed in U.S. Pat. No. 6,206,397. A dual short link design that employs links pivoting in the same direction is disclosed in U.S. Pat. No. 7,128,329 (Weagle).

Many of the patented dual short link suspension designs featuring two short links rotating in the same direction emulate the function of Weagle's or the VPP designs in various ways, but differ with respect to the placement, length and pivot locations of the two short links. The chainstay lengthening/anti-squat effects are derived from the placement of the links and pivot points. Many known designs focus on the designer's version of optimal anti-squat characteristics, minimizing overall chainstay lengthening to varying degrees, the use of low speed compression damping on the shock absorber to reduce unwanted suspension movement, and minimizing the effects of the rear brake on the suspension system.

Many known suspension designs endeavour to optimize pedalling efficiency by providing sufficient anti-squat to balance the rearward weight shift due to acceleration, in selected optimal gear combinations, which balancing is referred to as 100% anti-squat. The value of anti-squat depends on acceleration. If there is no acceleration, anti-squat is irrelevant. The greatest rate of acceleration of a bicycle is achieved when accelerating from a standstill or from a low speed, with the rate of acceleration (and the amount of anti-squat required to balance squat) quickly dropping off as one approaches the desired speed of travel.

Numerous bicycle systems and variations of same are known. For example, as described in the following US patents: U.S. Pat. No. 5,553,881, BICYCLE REAR SUSPENSION SYSTEM, Klassen et al., 10 Sep. 1996; U.S. Pat. No. 5,628,524, BICYCLE WHEEL TRAVEL PATH FOR SELECTIVELY APPLYING CHAINSTAY LENGTHENING EFFECT AND APPARATUS FOR PROVIDING SAME, Klassen et al., 13 May 1997; U.S. Pat. No. 6,206,397, BICYCLE WHEEL TRAVEL PATH FOR SELECTIVELY APPLYING CHAINSTAY LENGTHENING EFFECT AND APPARATUS FOR PROVIDING SAME, Klassen et al., 27 Mar. 2001; U.S. Pat. No. 6,843,494, REAR SUSPENSION SYSTEM FOR TWO-WHEELED VEHICLES, PARTICULARLY BICYCLES, Lam, 18 Jan. 2005; U.S. Pat. No. 6,969,081, BICYCLE REAR SUSPENSION, Whyte, 29 Nov. 2005; U.S. Pat. No. 7,128,329, VEHICLE SUSPENSION SYSTEMS, Weagle, 31 Oct. 2006; U.S. Pat. No. 7,240,912, BICYCLE REAR SUSPENSION, Whyte, 10 Jul. 2007; U.S. Pat. No. 7,828,314, VEHICLE SUSPENSION SYSTEMS, Weagle, 9 Nov. 2010; U.S. Pat. No. 7,934,739, BICYCLE REAR SUSPENSION, Domahidy, 3 May 2011; US 2008/0,054,595 BICYCLE FRAME WITH A COUNTER-ROTATING FOUR BAR LINKAGE SYSTEM, Lu, 6 Mar. 2008; US 2008/0,277,900, BICYCLE WITH A COMMON PIVOT SHOCK ABSORBER, I, 13 Nov. 2008; U.S. Pat. No. 7,048,292, BICYCLE SUSPENSION SYSTEMS, Weagle, 23 May 2006; and US 2014/0,042,726, SUSPENSION SYSTEM FOR WHEELED VEHICLES, Canfield et al., 13 Feb. 2014.

SUMMARY OF THE INVENTION

Excluding single-pivot rear suspension systems, most bicycle rear suspension systems feature an instant centre. An instant centre, also called the instantaneous centre or instant centre of rotation, is the point around which all points in a body undergoing planar movement that is neither a pure displacement (i.e., not merely linear) nor a pure rotation (i.e., not merely rotation about a fixed centre), are rotating at a specific instant in time. As the planar movement is not a pure rotation, there is a different instant centre for each instant in time/position of the body. The different instant centres define a curve, referred to as the moving centrode and at times referred to herein as the path, or path of movement, of the instant centre. In the case of a body subject to constrained reciprocating movement, the instant centre follows a constrained reciprocating path.

In a bicycle rear suspension system in which the "rear triangle" (being the component to which the axle of the rear wheel is mounted) is connected to the front triangle by two links, the rear triangle has an instant centre. The instant centre of the "rear triangle" and the path of movement of the instant centre can readily be visualized from the two links connecting the rear triangle to the front triangle. The instant centre is located at the intersection of an imaginary straight line passing through the first link rear triangle pivot axis (being the axis of the pivotal couple of the first link to the rear triangle) and the first link front triangle pivot axis (being the axis of the pivotal attachment of the first link to the front triangle); and an imaginary straight line passing through the second link rear triangle pivot axis (being the axis of the pivotal couple of the second link to the rear triangle) and the second link front triangle pivot axis (being the axis of the pivotal attachment of the second link to the front triangle).

Embodiments of the present invention are directed to reducing instabilities and imbalances in the "balance of torques" between the rear triangle and the front triangle. The following explanation of balance of torques ignores the effects of terrain and greatly simplifies the dynamic interaction of the components of a bicycle with a rear suspension system when in use. However, this simplified characterization of a rear suspension system is understood to be sufficiently correct for an understanding of balance of torques.

In a bicycle in use, force is transferred from the front triangle to the rear triangle through tension applied to the chain; and force is transferred from the rear triangle to the front triangle through the link attachment points. Viewed from the perspective of the rear triangle, the force applied to the front triangle through the link attachment points creates a torque on the front triangle.

It is useful to consider the mechanical efficiency of a bicycle rear suspension from a "statics" perspective, that is, assuming there is no acceleration. This is a useful assumption because with a bicycle in use there are situations where there is high chain tension but only a small rate of acceleration, for example: when climbing a grade; or when pushing big/hard gears to maintain speed.

When applied to a bicycle with a rear suspension, a statics perspective may be modeled using a simple beam, where there are two supports and one pivot. The "beam" is the front triangle, the rear suspension link attachment points (pivot points) to the front triangle are the supports, and the instant center of the rear triangle is the pivot. Taking this simplified modeling one step further, the instant centre may be notionally moved horizontally to lie on the "beam", i.e., on a line intersecting the front triangle pivot axes, i.e. the pivot axis of each of the link attachment points to the front triangle.

In considering this model, it is understood that if there is a lower link attachment point located a distance (DL) below the notional instant centre and an upper link attachment point located a distance (DU) above the notional instant centre, with DL not equal to DU (typically, in conventional suspension systems the distance DU may be multiples of the distance DL), then the application of a horizontal force (i.e., along the chain line) at the notional instant centre creates moment arms between the instant centre and the two link attachment points, becoming moments rotating about the instant centre.

For example, consider a suspension system in which the link pivot attachments are located such that DU equals 3DL. If a unitless force of 100 is applied horizontally at the notional instant centre, the force at the upper link pivotal attachment point is 25, and the force at the lower link pivotal attachment point is 75, and the forces become moments rotating about the instant centre (i.e., torques). The two moments/torques act in opposition, and the forces balance each other, resulting in a force of 100 acting horizontally on the notional instant centre. To understand how this balance of torques impacts the stability and efficiency of the rear suspension, it is useful to visualize two people leaning against each other. When two people lean against each other, they exert equal but opposing forces. However, the forces are dynamic because each person moves around a little bit to retain balance. The dynamic nature of the forces they exert upsets the balance between the two people, causing movement as they attain new equilibriums. The instability of this dynamic movement between two people leaning against each other is akin to efficiency reducing dynamic movement in a rear suspension system, for example, pedal bob.

By contrast, the inventor understands that a bicycle rear suspension system in which, when the suspension is at the sag point, the link pivotal attachment points are no higher than, or below, the instant centre, may be visualized as akin to one person leaning against a wall. The wall and person exert equal but opposing forces, as with the two people leaning against each other. However, since the wall is rigid, the forces are not dynamic, and it is easier for the person to maintain stability.

For example, consider a configuration in which, with the suspension at the sag point, a first link pivotal attachment point is in substantial horizontal alignment with the instant centre and a second link pivotal attachment point is at a lower location than the first link pivotal attachment. If a unitless force of 100 is applied horizontally at the instant centre, the force at the first pivotal attachment point is 100 (or substantially 100), and the force at the second attachment point is 0 (or substantially 0), such that substantially no moment arms are created about the instant centre. Because there are no moment arms, there is no balance of torque transmitted through the front triangle. It is understood that as there is no balance of forces to upset, the bicycle rear suspension system is more stable. It is understood that if the link pivotal attachments that connect the rear suspension to the front triangle are both at or below the instant centre at the sag point, no opposing moments are balanced against each other and only the moment arm that creates the anti-squat torque is applied to the front triangle.

Some embodiments of the present invention are configured such that at least one of the links is substantially horizontal at the sag point, as this is understood to contribute to a hard tail pedal feel. It is understood that the hard tail feel occurs when a link is horizontal at the sag point because of how the forces are transferred from the rear triangle to the front triangle. If a link is horizontal, that link is in compression. There are no, or only minor, bending moments applied to the link. Those bending moments, if they exist, cause the link to flex/bend to some extent, so some energy is "wasted" bending components of the frame. From that, it is understood that the more parts of the linkage that are horizontal, or nearly horizontal, the less frame flex will occur under hard pedaling efforts, and the more efficient the suspension will be. If the attachment points for both links are at the same height, it is understood that the forces applied through the links would be the same. However, it may be preferable to configure the link with the better bracing angle so that it is oriented horizontally at the sag point.

Further, in some embodiments, the instant centre is located roughly vertically below the centre of mass of the rider and the bike. It is understood that this may be desirable because it is understood to equally distribute the pedal bob forces between the front and rear suspension, thus increasing inherent resistance to pedal bob. For example, when the instant centre is forward of vertical alignment with the riders centre of mass, the rear suspension has to deal with more pedal bob forces than the front suspension.

Because the locations of the front triangle pivot axes are at or below the instant centre, the 'moment arm' for the 'less than 100% anti-squat' portion of the pedaling force is non-existent or short. By contrast, in most suspension designs, the highest pivot point attaching the upper link to the front triangle is much closer to the seat, resulting in a longer moment arm. Such a longer moment arm "amplifies" the "less than 100% anti-squat" force, causing more pedal bob and decreasing efficiency. This is the same reason it is easier to tighten or loosen a bolt with a wrench than it is with fingers. The wrench is a lever. The "lever" in a bicycle suspension that acts on the "less than 100% anti-squat" portion of the chain tension force vector is the front triangle. The length of the lever is the distance between the pivot connecting the suspension's upper link to the front triangle, and the instant centre.

In one aspect, the present invention provides a bicycle suspension system for attaching a rear wheel with a rear wheel axle defining a rear wheel axis of rotation, to a front triangle, being the component of a bicycle, equipped with the suspension system, having a bottom bracket defining a bottom bracket axis of rotation, the bicycle having a right side being on the right hand side when the bicycle is viewed from the rear, the bicycle suspension system including: a rear triangle to which the rear wheel axle is mounted; a first link: pivotally connected to a front triangle at a first link front triangle pivot defining a first link front triangle pivot axis; and pivotally connected to the rear triangle at a first link rear triangle pivot defining a first link rear triangle pivot axis; a second link: pivotally connected to the front triangle at a second link front triangle pivot defining a second link front triangle pivot axis; and pivotally connected to the rear triangle at a second link rear triangle pivot defining a second link rear triangle pivot axis; and a shock absorber device directly or indirectly interconnected between two of the front triangle, rear triangle, first link and second link, for resiliently impeding relative movement of the suspension system from an unloaded at-rest position; wherein: the suspension system has a sag point; the rear triangle defines an instant centre; and with a bicycle equipped with the suspension system, resting on a horizontal surface, with the suspension system at the sag point, the first link front triangle pivot axis and the second link front triangle pivot axis are no higher than a horizontal line passing through the instant centre.

With the bicycle equipped with the suspension system, resting on the horizontal surface, with the suspension system at the sag point, a first link line passing through the first link front triangle pivot axis and the first link rear triangle pivot axis may be substantially horizontal.

With the bicycle equipped with the suspension system, resting on the horizontal surface, with the suspension system at the sag point, a second link line passing through the second link front triangle pivot axis and the second link rear triangle pivot axis may be substantially horizontal.

With the bicycle equipped with the suspension system, resting on the horizontal surface, with the suspension system at the sag point, a front triangle pivot line passing through the first link front triangle pivot axis and the second link front triangle pivot axis may be substantially horizontal. A rear triangle pivot line passing through the first link rear triangle pivot axis and the second link rear triangle pivot axis may be substantially horizontal, and the front triangle pivot line and the rear triangle pivot line may be different lines. One, but not both, of: a first link line passing through the first link front triangle pivot axis and the first link rear triangle pivot axis; and a second link line passing through the second link front triangle pivot axis and the second link rear triangle pivot axis; may be substantially horizontal.

SUMMARY OF THE DRAWINGS

The drawings are schematic right-side elevation views of rear suspension system embodiments of the present invention shown as if supported by a flat horizontal surface. In what follows, the descriptive terms used for the embodiments consist of, or contain, shorthand references to the general direction of projection and pivotal movement of the first link (generally, the rearward link) and the general direction of projection and pivotal movement of the second link, in that order.

DETAILED DESCRIPTION WITH REFERENCE TO THE DRAWINGS

Figure 1:
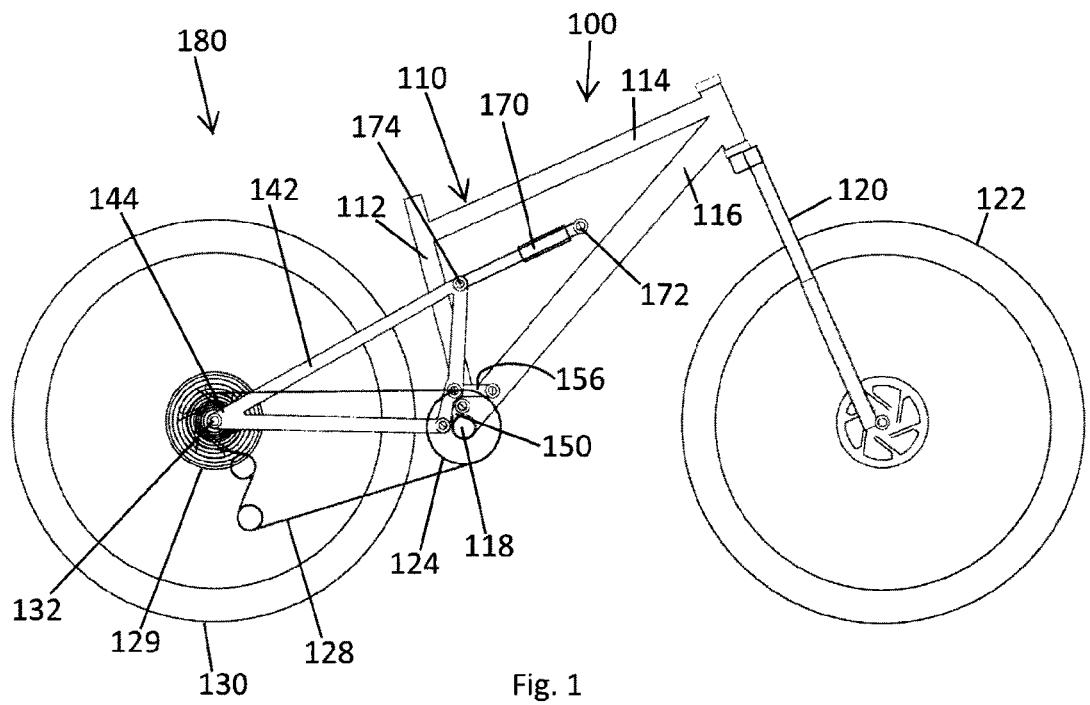
FIG. 1 shows a rearward-clockwise-rearward-clockwise embodiment of the present invention with the bicycle not loaded (i.e., with the suspension system at its uncompressed "at-rest" position).

In the drawings, the schematic representations of the bicycle embodiments of the present invention show conventional bicycle features in a simplified manner that for current purposes ignores the possible variations in configurations and details of these features. For example, it is well known that modern materials permit configurations considerably different from the simple "triangle" composed of tubes, suggested by the schematic representations.

In the drawings, there is shown a bicycle 100 including a front triangle 110. The front triangle 110 is schematically represented as having a seat tube 112, a top tube 114 and a down tube 116. A bottom bracket 118 is located at the juncture of the seat tube 112 and the down tube 116. A chainring 124 is mounted at the bottom bracket 118. Crank arms 126 (left side crank arm not shown in the drawings) are also mounted at the bottom bracket 118. Mounted to the front triangle 110 there are front forks 120, to which the front wheel 122 is mounted. The bicycle 100 includes a rear wheel 130, attached to the front triangle 110 via a rear suspension system embodiment of the present invention.

The rear suspension system embodiments all include a rear triangle 142, being the component to which the rear wheel 130 is mounted at the rear wheel mount 144 so as to define the rear wheel axis of rotation 132. To be clear, in some of the embodiments described herein and shown in the drawings, the component to which the rear wheel 130 is mounted is not in the shape of a triangle. However, the term rear triangle 142 is used throughout for conceptual consistency.

The rear suspension system embodiments all also include two links interconnecting the front triangle 110 and the rear triangle 142, being: a first link 150 having a first link front triangle pivot axis 152 and a first link rear triangle pivot axis 154; and a second link 156 having a second link front triangle pivot axis 158 and a second link rear triangle pivot axis 160.

The rear suspension system embodiments all also include a shock absorber 170 having a shock front-triangle mount end 172 and a shock suspension mount end 174. The shock front-triangle mount end 172 is mounted to the front triangle 110, although, reflective of the schematic nature of the drawings, in some of the drawings, a connection between the shock front-triangle mount end 172 and the front triangle 110 is not indicated.

The following approach is used herein for providing numerical information for the position of components and pivots/couples with respect to a typical bicycle wheel size with the bicycle not loaded (i.e., with the suspension system at its uncompressed "at-rest" position) and with a flat surface supporting both wheels of the bicycle: an X,Y coordinate system with the X axis parallel to the flat surface, with the intersection of the X axis and Y axis aligned with the axis of rotation within the bottom bracket, and with the units in millimeters (mm).

In the embodiments shown in the drawings, the rear wheel axis of rotation 132 is located at X=−435 mm, Y=10.0 mm.

In what follows, negative X values for pivot locations may be bounded by the radius of the rear wheel 130. However, it is understood that it is possible to have pivot and couple locations that intrude into the radius of the rear wheel.

In the drawings, bicycle embodiments are shown viewed from the right side. Related to this, movement of components is generally described herein as if viewed from the right side of the bicycle. For example, pivotal movement of the first link 150 and second link 156 is described as "clockwise" or "counterclockwise" relative to the front triangle 110 (i.e., about the first link front triangle pivot axis 152 and second link front triangle pivot axis 158, respectively) as viewed from the right side of the bicycle.

Figure 8:
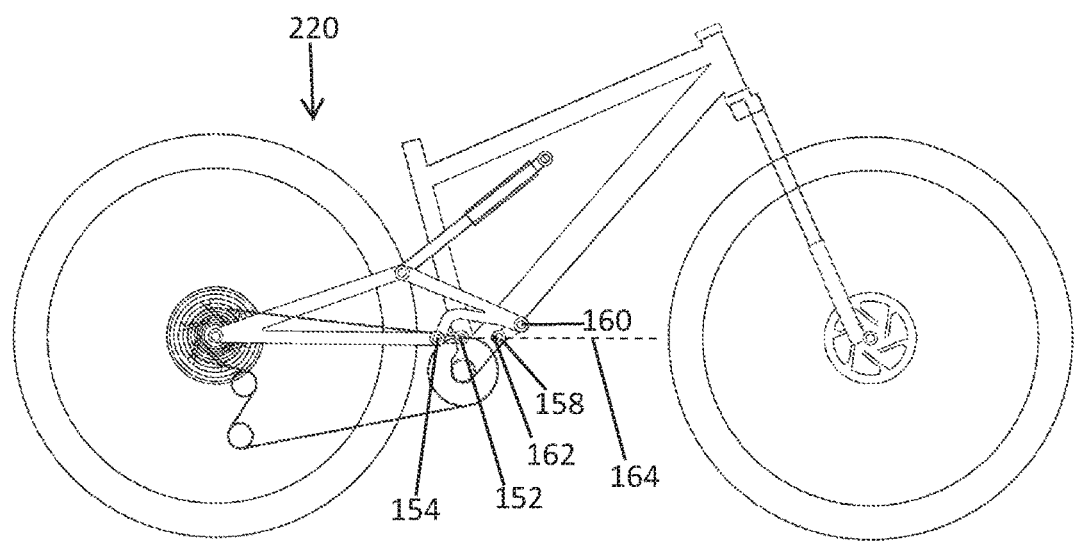
FIG. 8 shows the embodiment of FIG. 7 with the suspension system at an illustrative sag point.

The drawings, in some instances, show suspension system embodiments: at uncompressed "at-rest" positions; at an illustrative sag point (in the range of 30%-33% of the total suspension travel); and at full compression. For illustrative purposes, in FIG. 8 an instant centre 162 is indicated by a dot (.) and a notional front triangle pivot line 164 is indicated by a dashed line.

The suspension system embodiments disclosed herein may be characterized in terms of: whether each of the first link 150 and second link 156 projects generally rearward or forward (from the first link front triangle pivot axis 152 and second link front triangle pivot axis 158, respectively), with the suspension system in the at-rest position; and whether pivotal movement of each of the first link 150 and second link 156 is clockwise or counterclockwise as the suspension system moves from the at-rest position to the sag point. To be clear, in this context, projecting generally rearward or projecting generally forward, does not mean pure horizontal projection, and each such projection may include an upward or downward component.

Following the above approach to characterizing suspension systems, embodiments are at times referred to herein in a shorthand manner, comprising the projection and pivotal movement of the first link 150 and second link 156, in that order. For example, in the embodiment shown in FIGS. 1 and 2, the first link 150 projects rearward and pivots clockwise and the second link 156 also projects rearward and pivots clockwise. Thus, the embodiment shown in FIGS. 1 and 2 is at times referred to herein as rearward-clockwise-rearward-clockwise embodiment 180.

Figure 2:
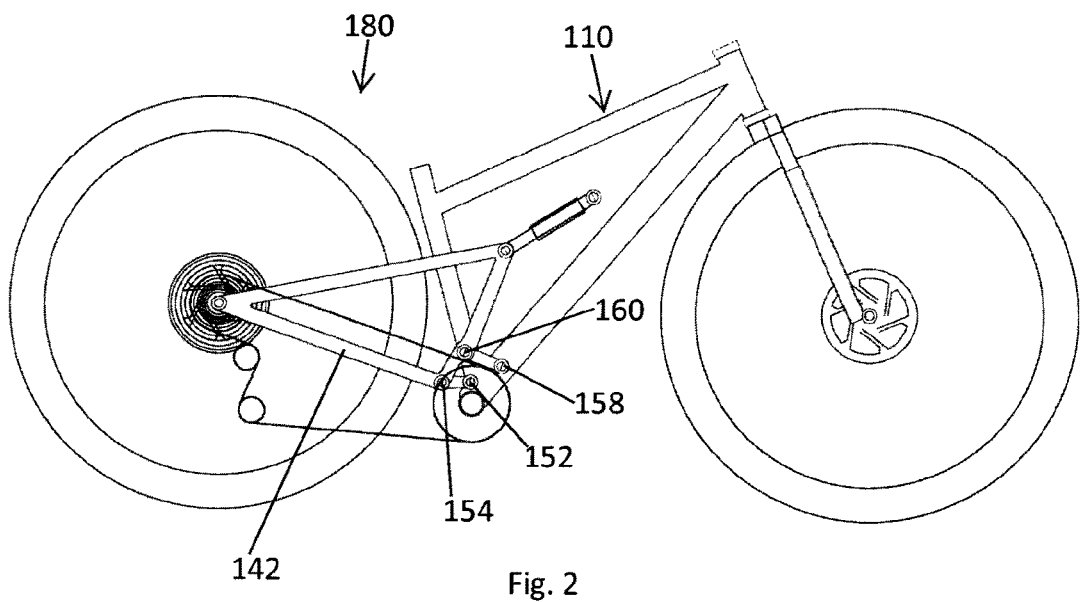
FIG. 2 shows the embodiment of FIG. 1 with the suspension system under compression.
Figure 3:
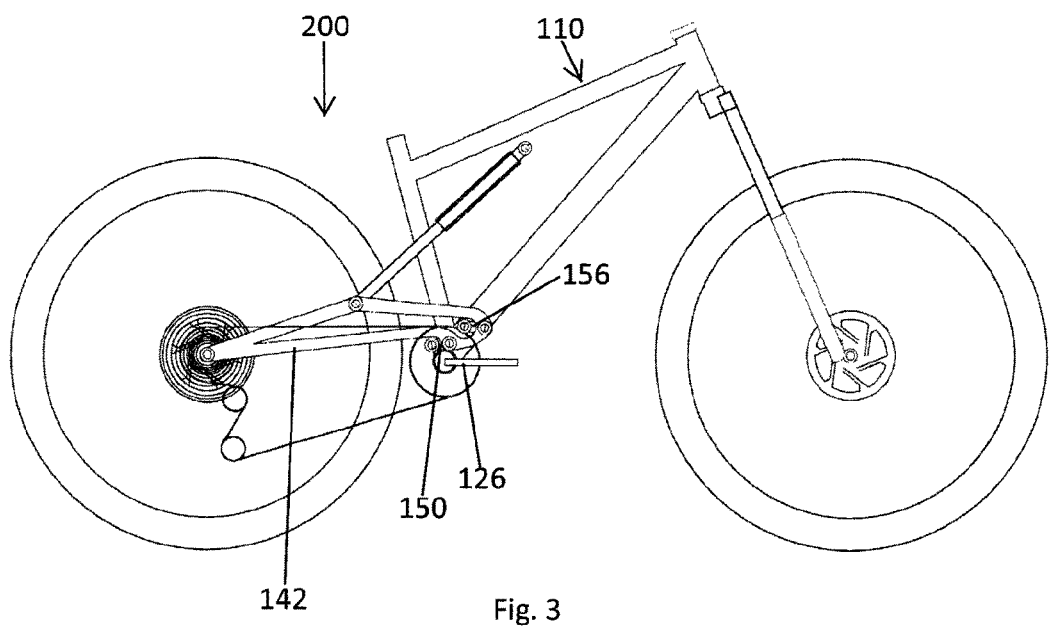
FIG. 3 shows a forward-counterclockwise-forward-counterclockwise embodiment of the present invention in the at-rest position.
Figure 4:
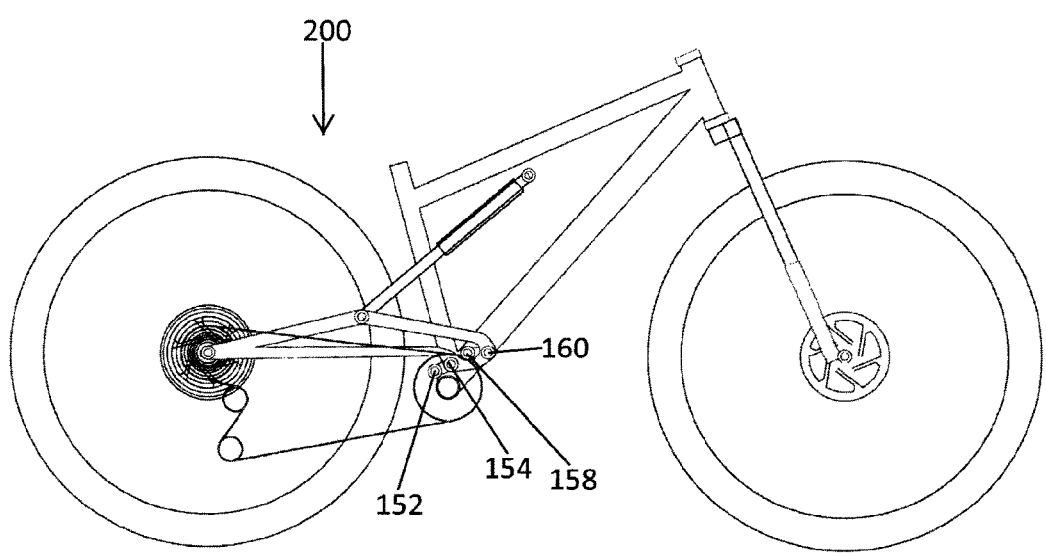
FIG. 4 shows the embodiment of FIG. 3 with the suspension system at an illustrative sag point.
Figure 5:
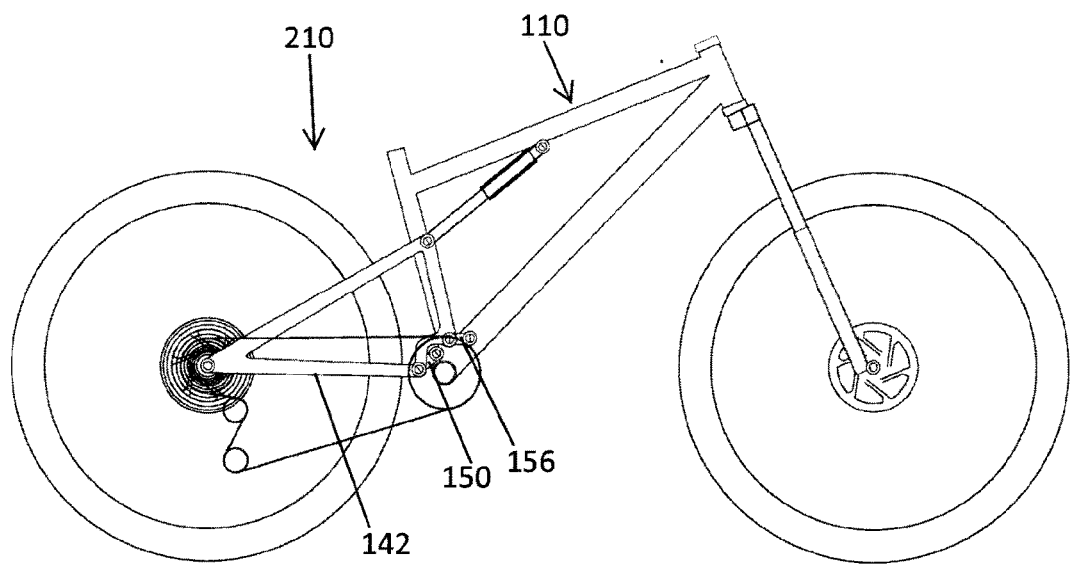
FIG. 5 shows a rearward-clockwise-rearward-clockwise embodiment of the present invention in the at-rest position.
Figure 6:
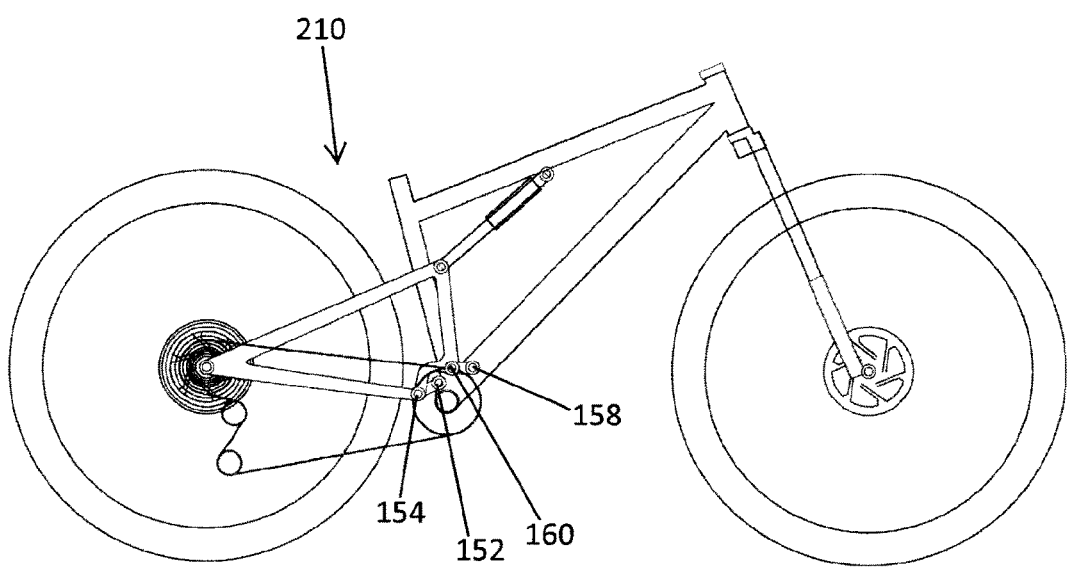
FIG. 6 shows the embodiment of FIG. 5 with the suspension system at an illustrative sag point.
Figure 7:
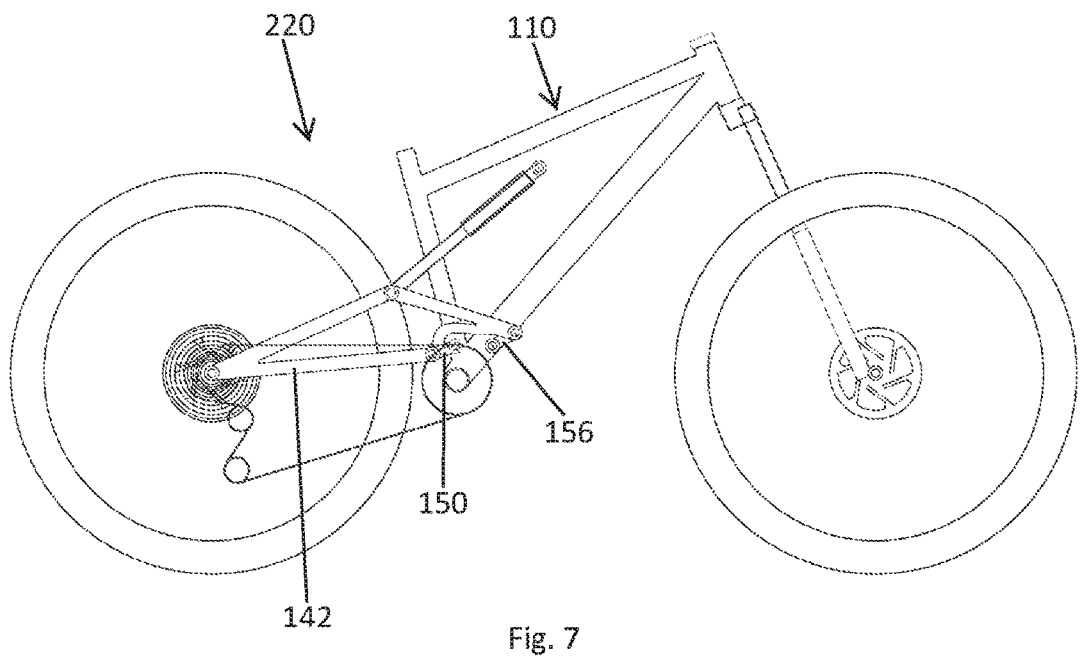
FIG. 7 shows a rearward-clockwise-forward-clockwise embodiment of the present invention in the at-rest position.
Figure 9:
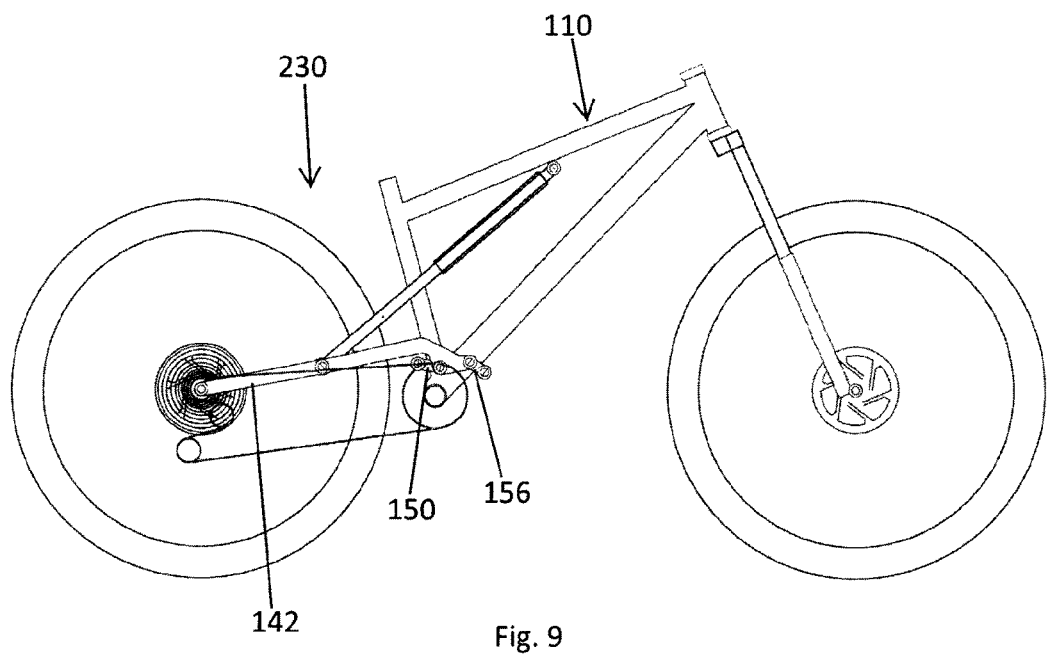
FIG. 9 shows a forward-counterclockwise-rearward-clockwise embodiment of the present invention in the at-rest position.
Figure 10:
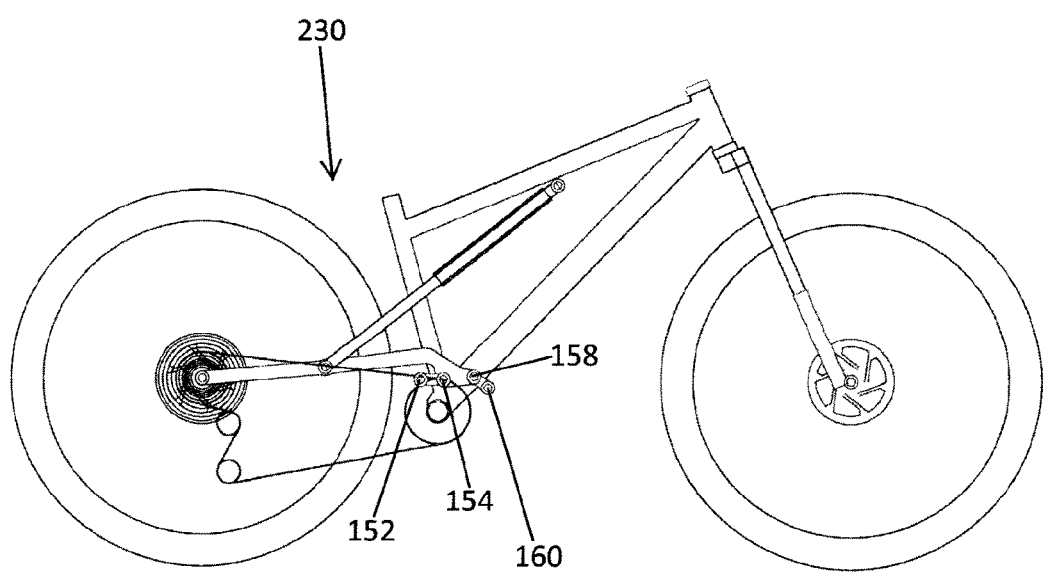
FIG. 10 shows the embodiment of FIG. 9 with the suspension system at an illustrative sag point.
Figure 11:
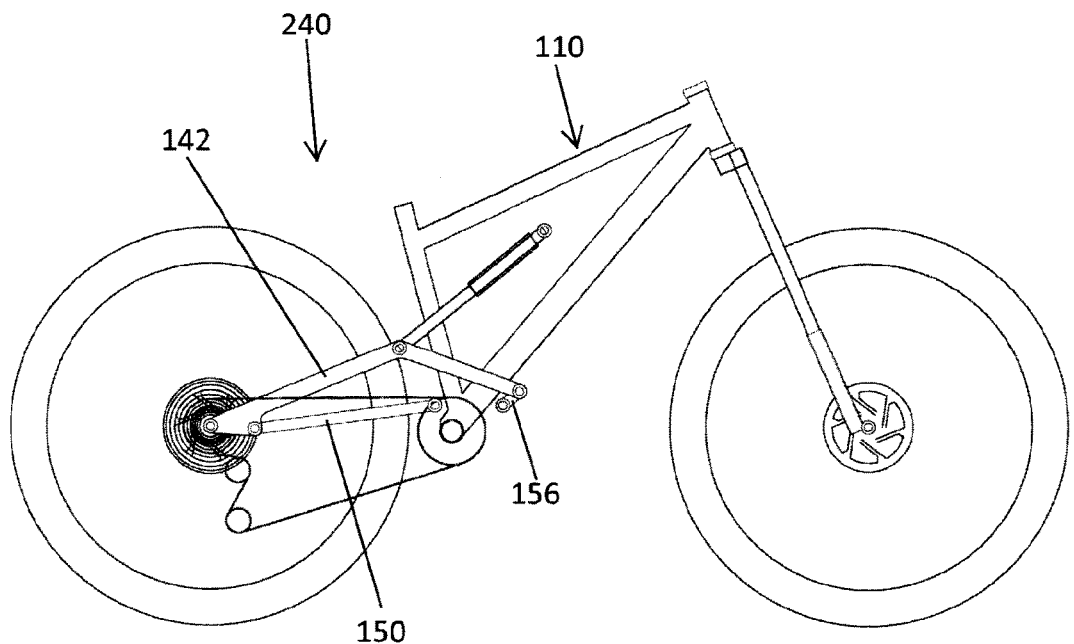
FIG. 11 shows a quasi-Horst-link rearward-clockwise-forward-clockwise embodiment of the present invention in the at-rest position.
Figure 12:
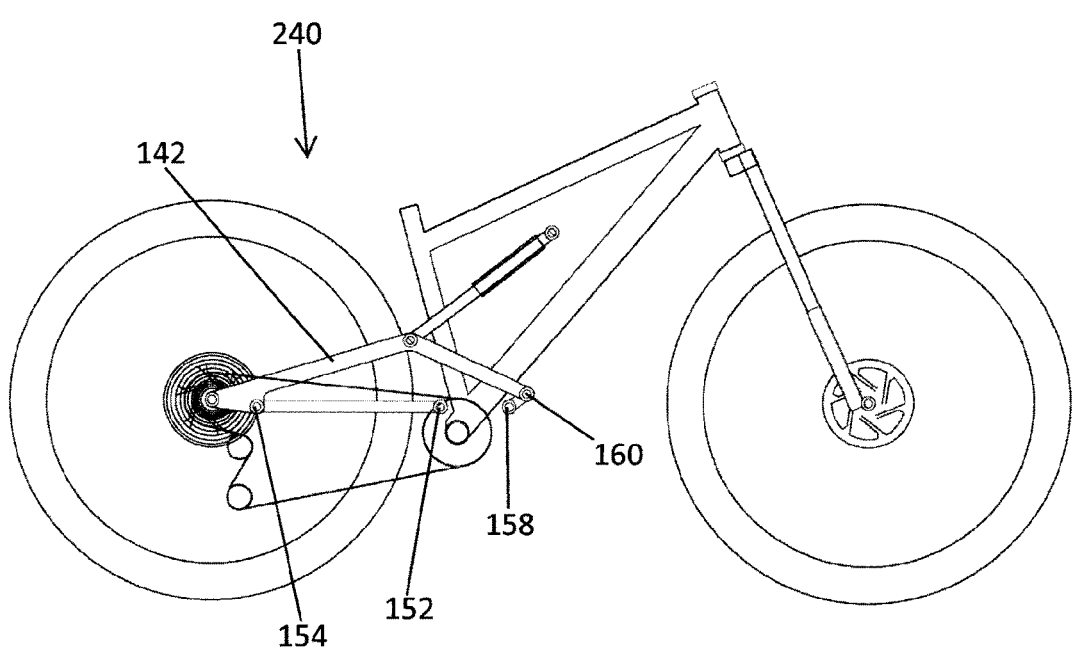
FIG. 12 shows the embodiment of FIG. 11 with the suspension system at an illustrative sag point.
Figure 13:
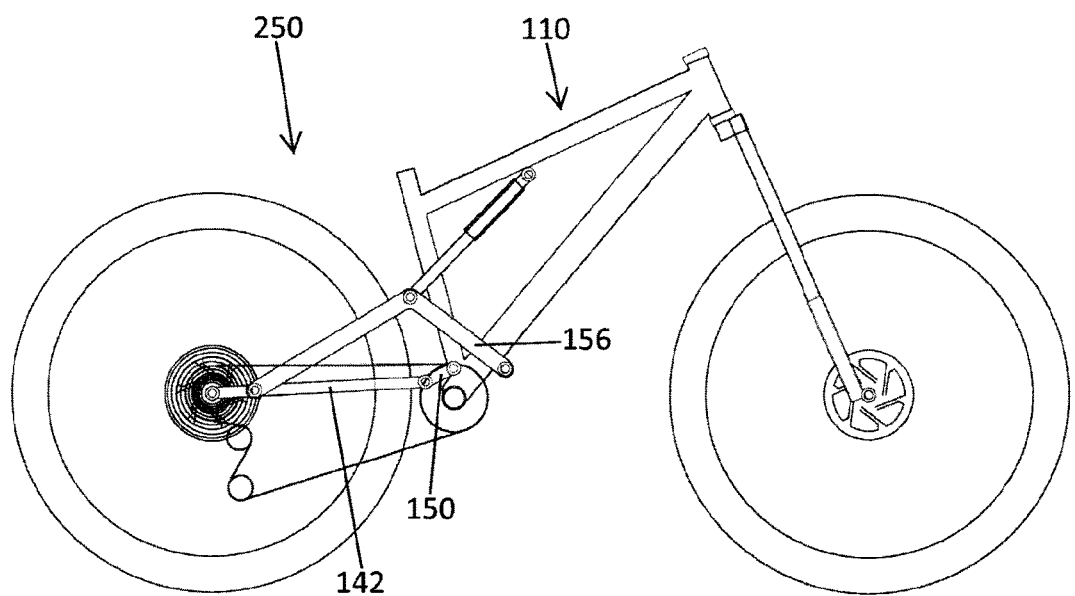
FIG. 13 shows a long-second-link rearward-clockwise-rearward-clockwise embodiment of the present invention in the at-rest position.
Figure 14:
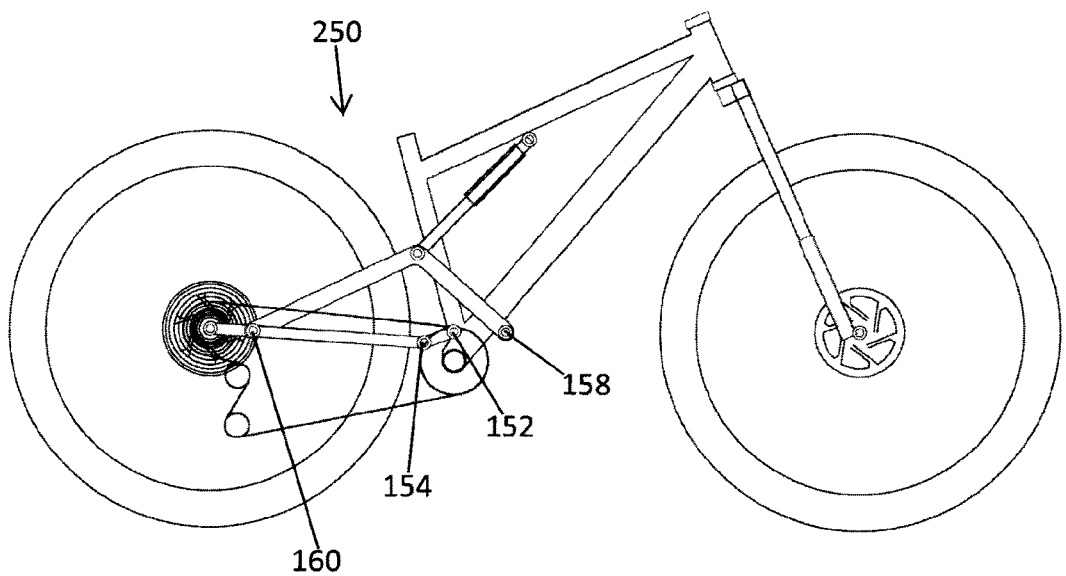
FIG. 14 shows the embodiment of FIG. 13 with the suspension system at an illustrative sag point.
Figure 15:
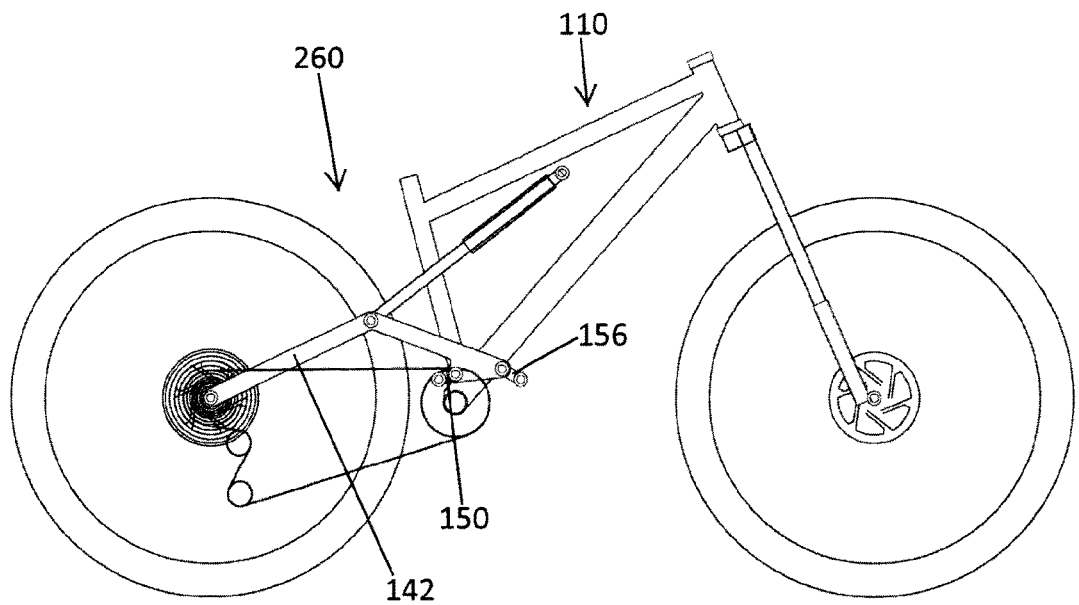
FIG. 15 shows a forward-counterclockwise-rearward-counterclockwise embodiment of the present invention in the at-rest position.
Figure 16:
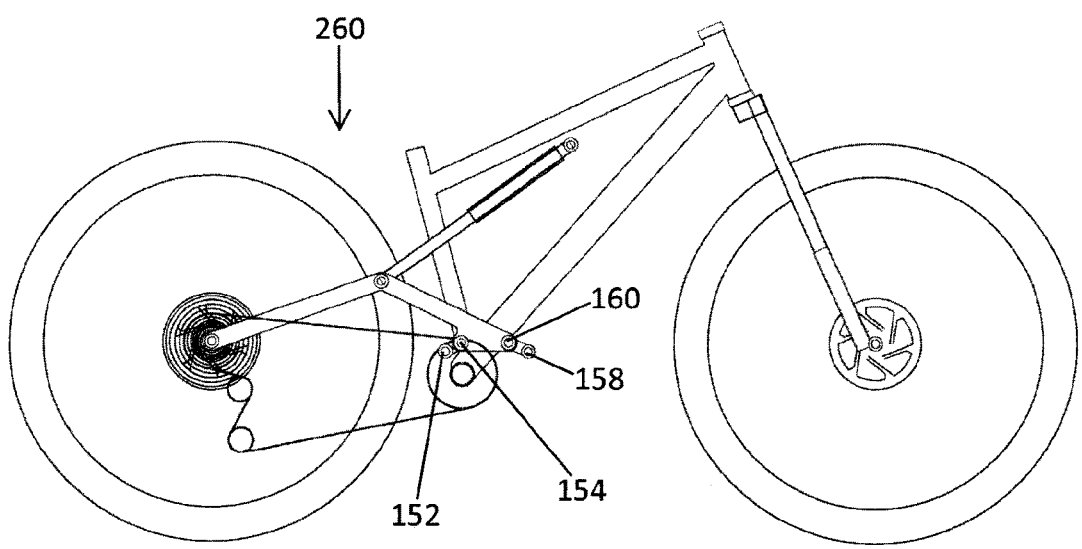
FIG. 16 shows the embodiment of FIG. 15 with the suspension system at an illustrative sag point.

In the rearward-clockwise-rearward-clockwise embodiment 180 shown in FIGS. 1 and 2, the pivot locations are:
first link front triangle pivot axis 152: X=−2.3 mm, Y=36.9 mm
first link rear triangle pivot axis 154: X=−36.6 mm, Y=2.9 mm
second link front triangle pivot axis 158: X=50.1 mm, Y=63.7 mm
second link rear triangle pivot axis 160: X=−16.6 mm, Y=57.7 mm To be clear, in the forward-counterclockwise-forward-counterclockwise embodiment 200 shown in FIGS. 3 and 4, the second link initially pivots counterclockwise for about the first 34% of its pivot travel and pivots clockwise for the remaining about 66% of its pivot travel. In the forward-counterclockwise-forward-counterclockwise embodiment 200 shown in FIGS. 3 and 4, the pivot locations are:
first link front triangle pivot axis 152: X=−23.4 mm, Y=29 mm
first link rear triangle pivot axis 154: X=7.9 mm, Y=32.3 mm
second link front triangle pivot axis 158: X=35.1 mm, Y=62.5 mm
second link rear triangle pivot axis 160: X=71.6 mm, Y=60.1 mm In the rearward-clockwise-rearward-clockwise embodiment 210 shown in FIGS. 5 and 6, the pivot locations are:
first link front triangle pivot axis 152: X=−14.5 mm, Y=34.4 mm
first link rear triangle pivot axis 154: X=−46.5 mm, Y=5.6 mm
second link front triangle pivot axis 158: X=45.4 mm, Y=62 mm
second link rear triangle pivot axis 160: X=8.5 mm, Y=59.6 mm To be clear, in the rearward-clockwise-forward-clockwise embodiment 220 shown in FIGS. 7 and 8, the second link initially pivots counterclockwise for about the first 9% of its pivot travel and pivots clockwise for the remaining about 91% of its pivot travel. In the rearward-clockwise-forward-clockwise embodiment 220 shown in FIGS. 7 and 8, the pivot locations are:

first link front triangle pivot axis 152: X=−2.3 mm, Y=58.7 mm first link rear triangle pivot axis 154: X=−42.3 mm, Y=44.8 mm second link front triangle pivot axis 158: X=61.8 mm, Y=59.2 mm second link rear triangle pivot axis 160: X=100.7 mm, Y=82.8 mm In the forward-counterclockwise-rearward-clockwise embodiment 230 shown in FIGS. 9 and 10, the second link initially pivots clockwise for about the first 43% of its pivot travel and pivots counterclockwise for the remaining about 57% or its pivot travel. In the forward-counterclockwise-rearward-clockwise embodiment 230, the pivot locations are:

first link front triangle pivot axis 152: X=−32.0 mm, Y=59.7 mm first link rear triangle pivot axis 154: X=9.5 mm, Y=52.8 mm second link front triangle pivot axis 158: X=92.4 mm, Y=44.3 mm second link rear triangle pivot axis 160: X=64.9 mm, Y=63.2 mm In the quasi-Horst-link rearward-clockwise-forward-clockwise embodiment 240 shown in FIGS. 11 and 12, the pivot locations are:

first link front triangle pivot axis 152: X=−29.9 mm, Y=46.0 mm first link rear triangle pivot axis 154: X=−352.4 mm, Y=3.6 mm second link front triangle pivot axis 158: X=91.7 mm, Y=46.0 mm second link rear triangle pivot axis 160: X=122.2 mm, Y=71.3 mm In the long-second-link rearward-clockwise-rearward-clockwise embodiment 250 shown in FIGS. 13 and 14, the pivot locations are:

first link front triangle pivot axis 152: X=−0.7 mm, Y=52.8 mm first link rear triangle pivot axis 154: X=51.2 mm, Y=28.2 mm second link front triangle pivot axis 158: X=91.8 mm, Y=52.6 mm second link rear triangle pivot axis 160: X=−356.0 mm, Y=12.8 mm In the forward-counterclockwise-rearward-counterclockwise embodiment 260 shown in FIGS. 15 and 16, the pivot locations are:

first link front triangle pivot axis 152: X=−29.8 mm, Y=40.9 mm first link rear triangle pivot axis 154: X=−0.1 mm, Y=50.3 mm second link front triangle pivot axis 158: X=115.6 mm, Y=40.3 mm second link rear triangle pivot axis 160: X=82.0 mm, Y=59.1 mm In the embodiments described herein and shown in the drawings, the shock absorber 170 is mounted at its proximal end to the front triangle 110 and coupled at its distal end to another component of the rear suspension (mainly, but not always, the rear triangle 142). To be clear, multiple other configurations of the shock absorber 170 are possible. For example, the shock absorber 170 could be interconnected between other components (for example, between a link and the front triangle 110). As well, the shock absorber 170 need not be directly connected to another component of the rear suspension or the front triangle 110, in that there may be intervening connectors or linkages between the shock absorber 170 and another component. Various configurations and arrangements for devices for absorbing shocks are known in the art. For example, in some cases, particularly in long travel downhill designs, it may be advantageous to use a linkage (not shown) between the shock absorber 170 and the rear triangle 142 so as to permit adjustments or specific shock rates not readily achievable when the shock absorber 170 is directly coupled to the rear triangle 142.

As is well known in bike rear suspension design, flexible members could be used to provide functionality akin to a pivot or couple described herein.

Aspects of embodiments of the present invention may have application in other suspension systems, for example in motorcycles or other vehicles with suspensions.

The scope of the claims should not be limited by the embodiments set forth in the examples, but should be given the broadest interpretation consistent with the description as a whole.

The invention claimed is:

1. A bicycle suspension system for attaching a rear wheel with a rear wheel axle defining a rear wheel axis of rotation, to a front triangle, being a component of a bicycle, equipped with the suspension system, having a bottom bracket defining a bottom bracket axis of rotation, the bicycle having a right side being on the right hand side when the bicycle is viewed from the rear, the bicycle suspension system comprising:
    a rear triangle to which the rear wheel axle is mounted;
    a first link:
        pivotally connected to a front triangle at a first link front triangle pivot defining a first link front triangle pivot axis; and
        pivotally connected to the rear triangle at a first link rear triangle pivot defining a first link rear triangle pivot axis;
    a second link:
        pivotally connected to the front triangle at a second link front triangle pivot defining a second link front triangle pivot axis; and
        pivotally connected to the rear triangle at a second link rear triangle pivot defining a second link rear triangle pivot axis; and
    a shock absorber device directly or indirectly interconnected between two of the front triangle, rear triangle, first link and second link, for resiliently impeding relative movement of the suspension system from an unloaded at-rest position;
wherein:
    the suspension system has a travel being a range of movement of the rear wheel axle from the unloaded at-rest position to a full compression position;
    the rear triangle defines an instant centre; and
    with a bicycle equipped with the suspension system, resting on a horizontal surface, with the suspension system at 20% to 35% of travel from the unloaded at-rest position:
        the first link front triangle pivot axis and the second link front triangle pivot axis are no higher than a horizontal line passing through the instant centre; and a front triangle pivot line passing through the first link front triangle pivot axis and the second link front triangle pivot axis is substantially horizontal.

2. The bicycle suspension system of claim 1, wherein a rear triangle pivot line passing through the first link rear triangle pivot axis and the second link rear triangle pivot axis is substantially horizontal, and the front triangle pivot line and the rear triangle pivot line are different lines.

3. The bicycle suspension system of claim 1, wherein one, but not both, of:
   a first link line passing through the first link front triangle pivot axis and the first link rear triangle pivot axis; and
   a second link line passing through the second link front triangle pivot axis and the second link rear triangle pivot axis;
is substantially horizontal.

4. The bicycle suspension system of claim 1, wherein, with the suspension system in the unloaded at-rest position, in terms of an X,Y coordinate system with the X axis parallel to the horizontal surface and with the intersection of the X axis and Y axis aligned with the bottom bracket axis of rotation, the coordinates are as follows:
   the rear wheel axis of rotation: X=−435 mm, Y=10.0 mm;
   the first link front triangle pivot axis: X=−2.3 mm, Y=58.7 mm;
   the first link rear triangle pivot axis: X=−42.3 mm, Y=44.8 mm;
   the second link front triangle pivot axis: X=61.8 mm, Y=59.2 mm; and
   the second link rear triangle pivot axis: X=100.7 mm, Y=82.8 mm.

5. The bicycle suspension system of claim 1, wherein, with the suspension system in the unloaded at-rest position, in terms of an X,Y coordinate system with the X axis parallel to the horizontal surface and with the intersection of the X axis and Y axis aligned with the bottom bracket axis of rotation, the coordinates are as follows:
   the rear wheel axis of rotation: X=−435 mm, Y=10.0 mm;
   the first link front triangle pivot axis: X=−32.0 mm, Y=59.7 mm;
   the first link rear triangle pivot axis: X=9.5 mm, Y=52.8 mm;
   the second link front triangle pivot axis: X=92.4 mm, Y=44.3 mm; and
   the second link rear triangle pivot axis: X=64.9 mm, Y=63.2 mm.

6. The bicycle suspension system of claim 1, wherein, with the suspension system in the unloaded at-rest position, in terms of an X,Y coordinate system with the X axis parallel to the horizontal surface and with the intersection of the X axis and Y axis aligned with the bottom bracket axis of rotation, the coordinates are as follows:
   the rear wheel axis of rotation: X=−435 mm, Y=10.0 mm;
   the first link front triangle pivot axis: X=−29.9 mm, Y=46.0 mm;
   the first link rear triangle pivot axis: X=−352.4 mm, Y=3.6 mm;
   the second link front triangle pivot axis: X=91.7 mm, Y=46.0 mm; and
   the second link rear triangle pivot axis: X=122.2 mm, Y=71.3 mm.

7. The bicycle suspension system of claim 1, wherein, with the suspension system in the unloaded at-rest position, in terms of an X,Y coordinate system with the X axis parallel to the horizontal surface and with the intersection of the X axis and Y axis aligned with the bottom bracket axis of rotation, the coordinates are as follows:
   the rear wheel axis of rotation: X=−435 mm, Y=10.0 mm;
   the first link front triangle pivot axis: X=−0.7 mm, Y=52.8 mm;
   the first link rear triangle pivot axis: X=51.2 mm, Y=28.2 mm;
   the second link front triangle pivot axis: X=91.8 mm, Y=52.6 mm; and
   the second link rear triangle pivot axis: X=−356.0 mm, Y=12.8 mm.

8. The bicycle suspension system of claim 1, wherein, with the suspension system in the unloaded at-rest position, in terms of an X,Y coordinate system with the X axis parallel to the horizontal surface and with the intersection of the X axis and Y axis aligned with the bottom bracket axis of rotation, the coordinates are as follows:
   the rear wheel axis of rotation: X=−435 mm, Y=10.0 mm;
   the first link front triangle pivot axis: X=−29.8 mm, Y=40.9 mm;
   the first link rear triangle pivot axis: X=−0.1 mm, Y=50.3 mm;
   the second link front triangle pivot axis: X=115.6 mm, Y=40.3 mm; and
   the second link rear triangle pivot axis: X=82.0 mm, Y=59.1 mm.

9. The bicycle suspension system of claim 1, wherein the shock absorber device is interconnected between the rear triangle and the front triangle.

10. A bicycle comprising the bicycle suspension system of claim 1.

* * * * *